Sept. 22, 1942.    H. J. LYMAN ET AL    2,296,721
TUNING MECHANISM
Filed Sept. 6, 1940    9 Sheets-Sheet 1

Inventors
Harry J. Lyman
Dana C. Manning
by their Attorneys
Howson & Howson

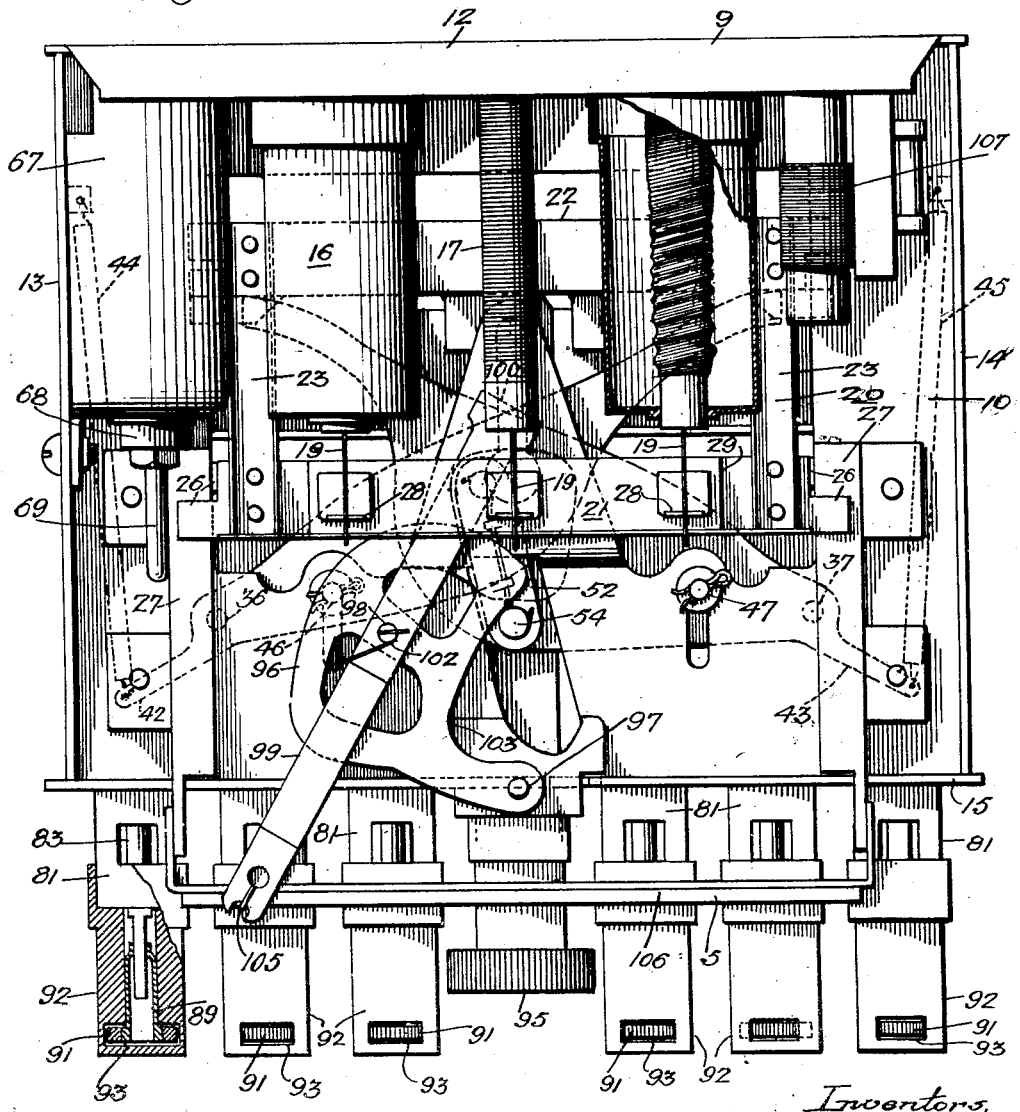

Sept. 22, 1942. H. J. LYMAN ET AL 2,296,721
TUNING MECHANISM
Filed Sept. 6, 1940 9 Sheets-Sheet 4
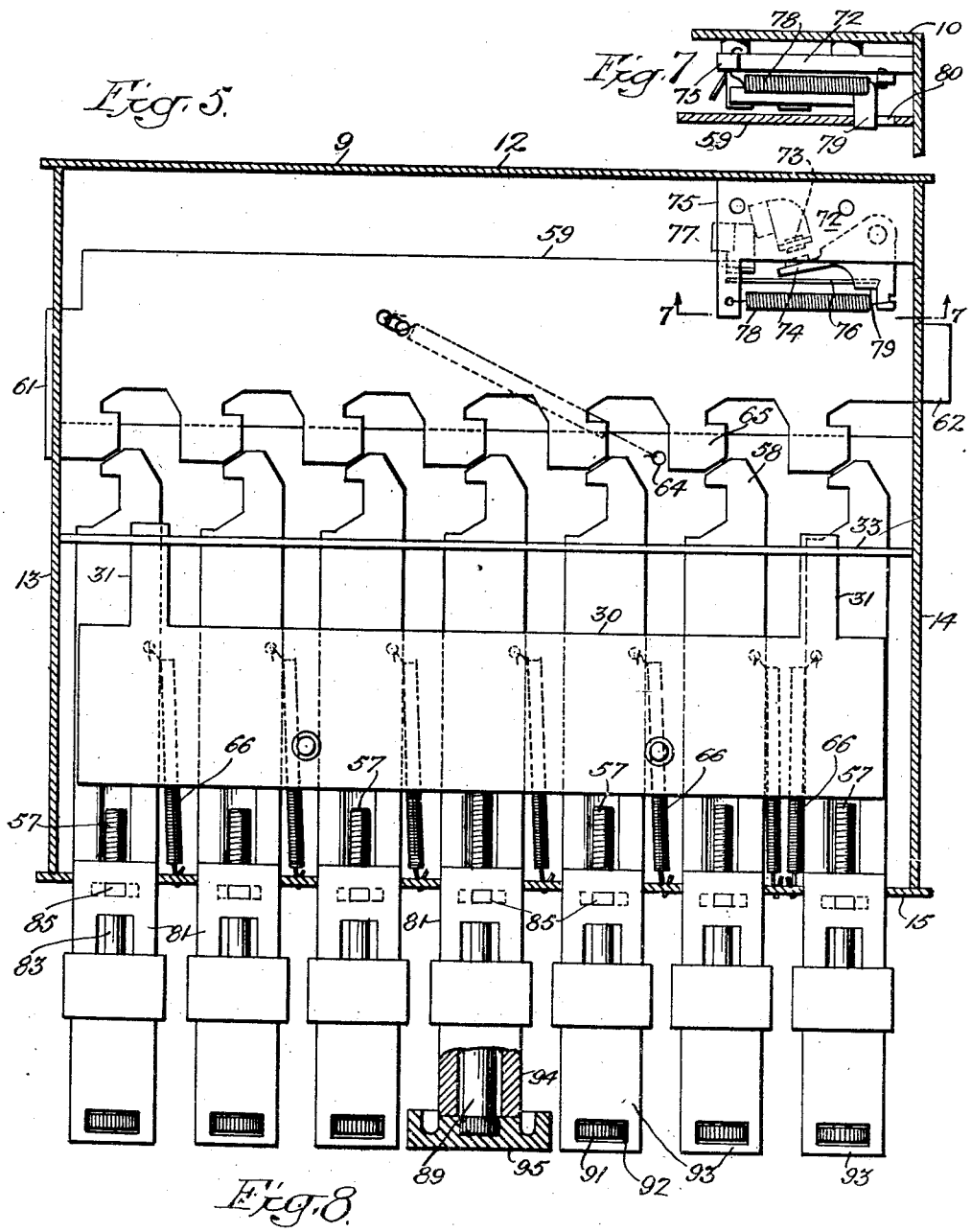
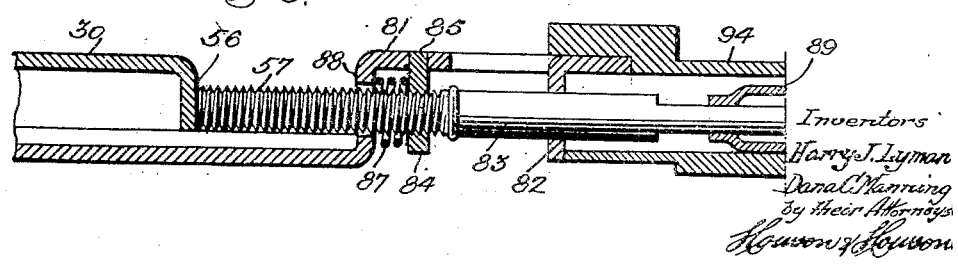
Inventors
Harry J. Lyman
Dana C. Manning
by their Attorneys Sept. 22, 1942.  H. J. LYMAN ET AL  2,296,721
TUNING MECHANISM
Filed Sept. 6, 1940  9 Sheets-Sheet 5
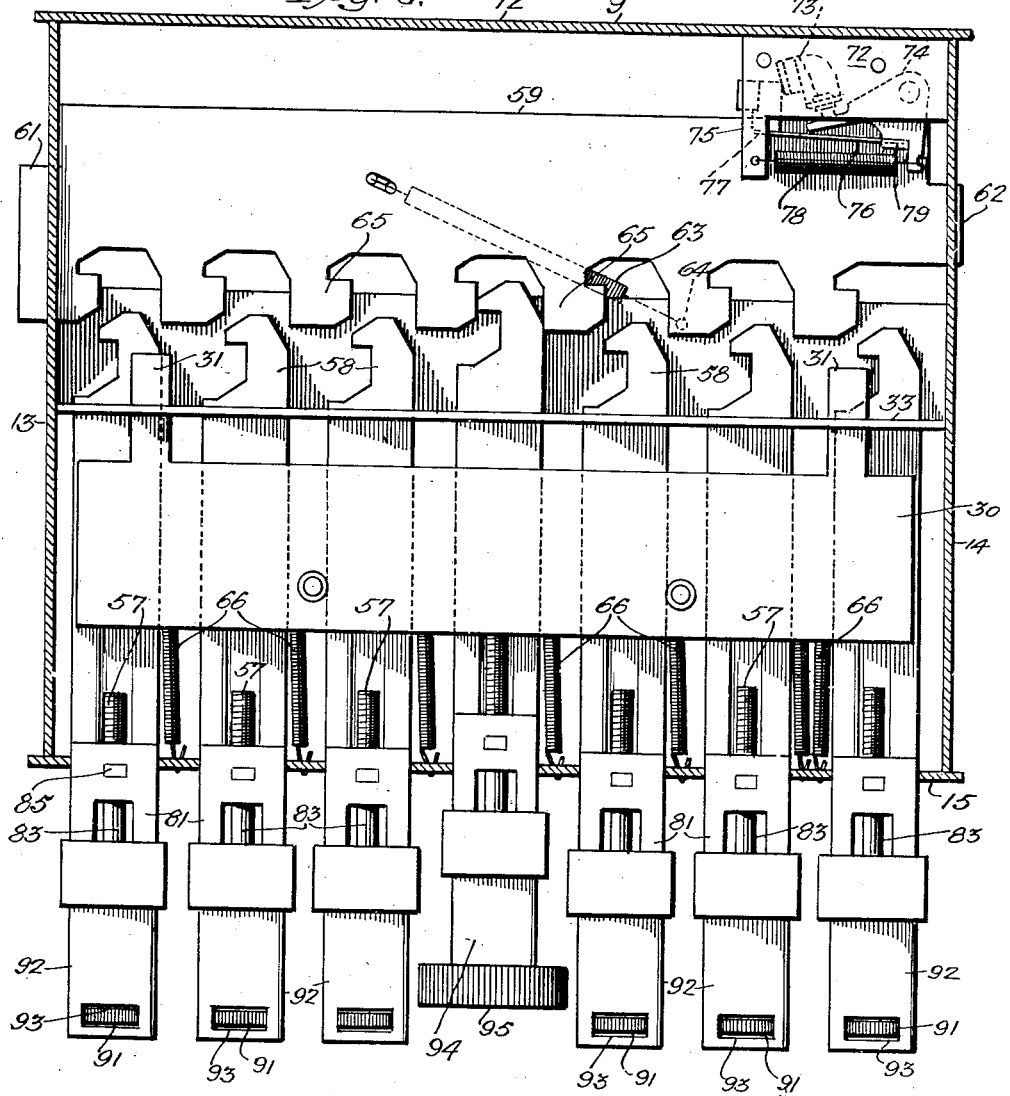
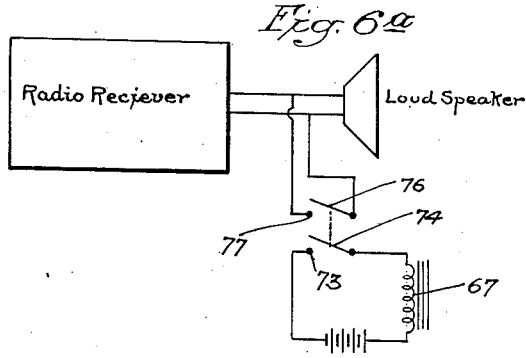
Inventors.
Harry J. Lyman
Dana C. Manning
by their Attorneys
Howson & Howson

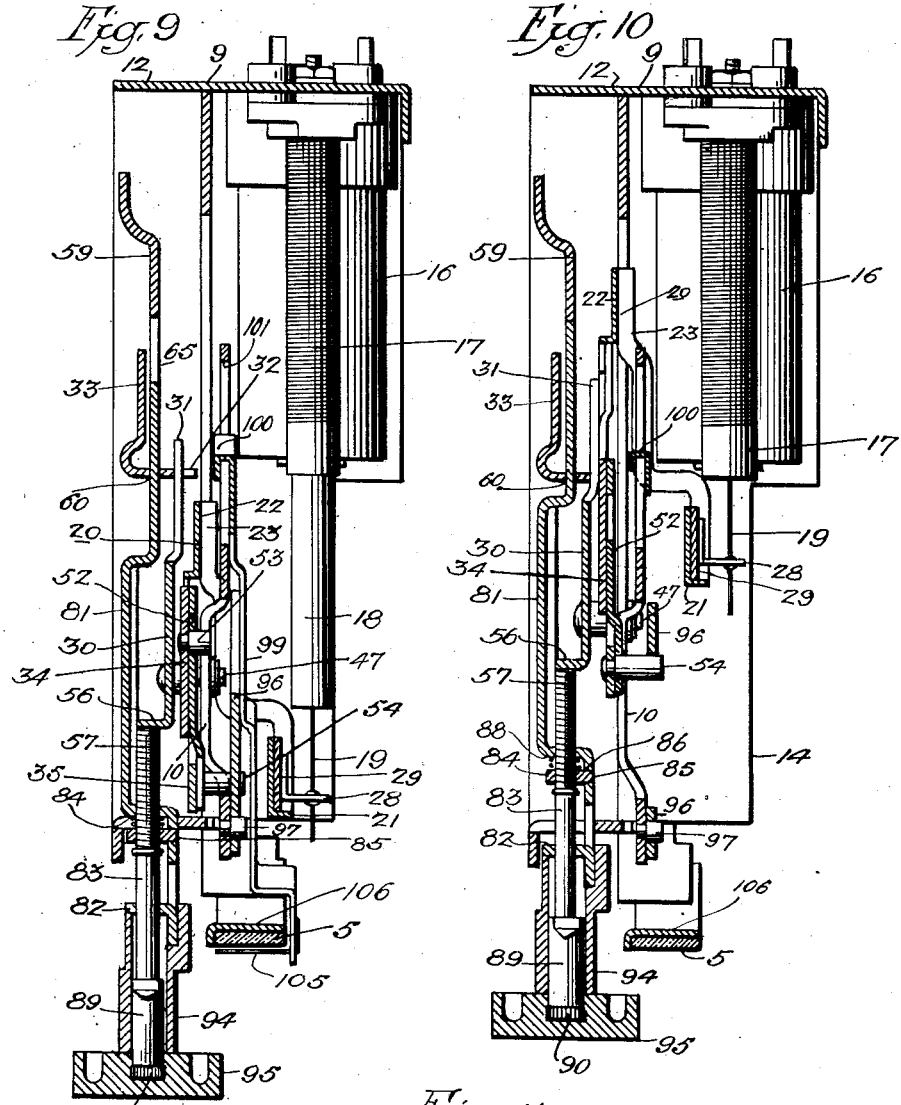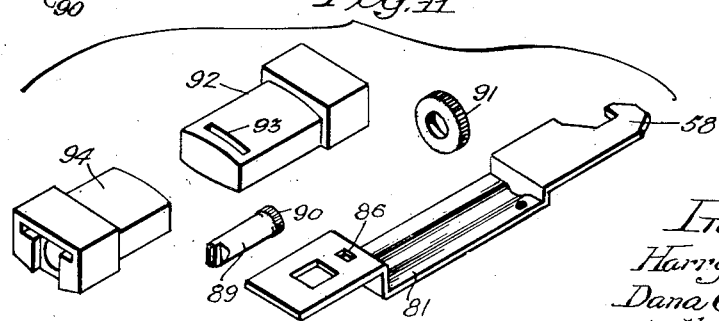

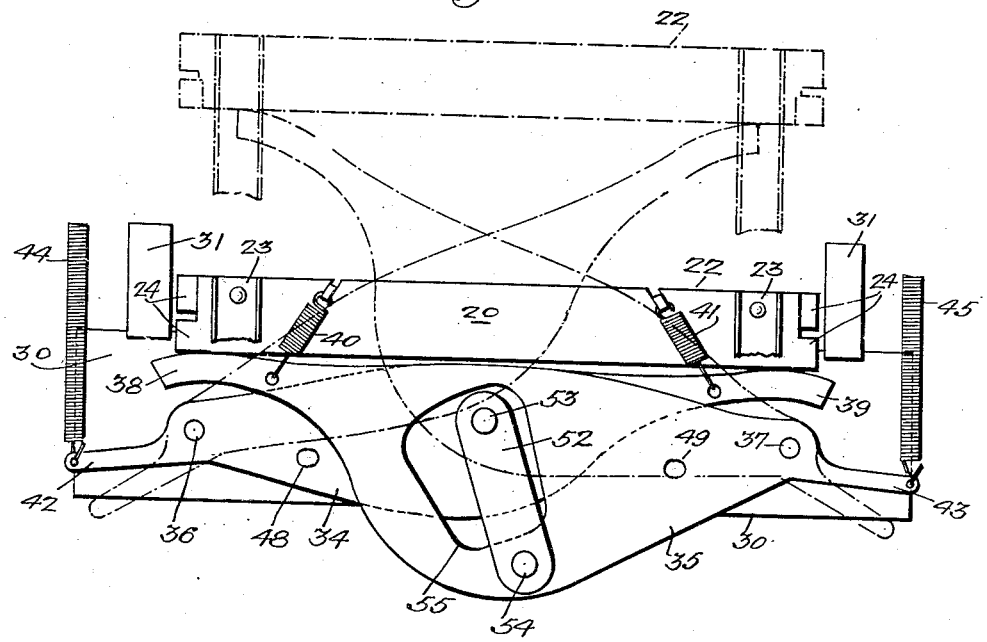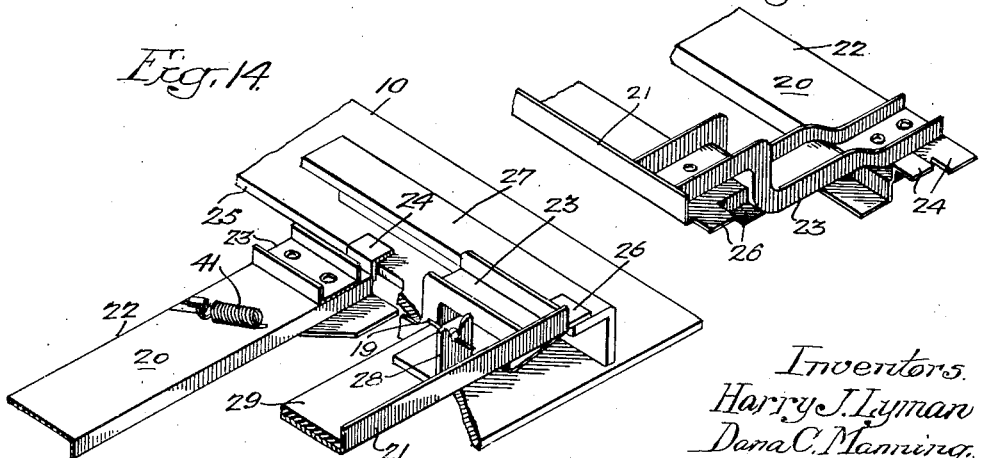

Sept. 22, 1942.  H. J. LYMAN ET AL  2,296,721
TUNING MECHANISM
Filed Sept. 6, 1940   9 Sheets-Sheet 8
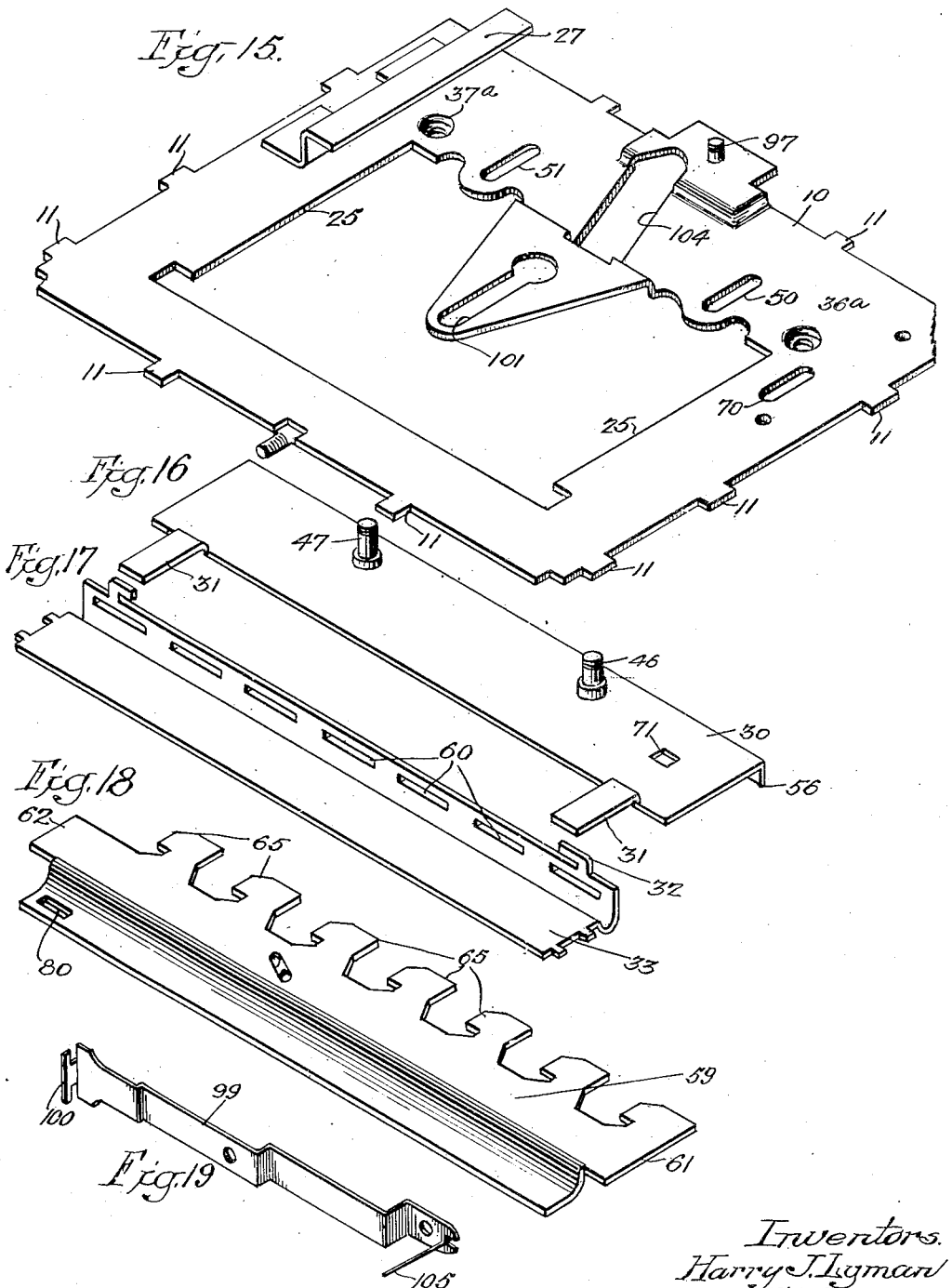

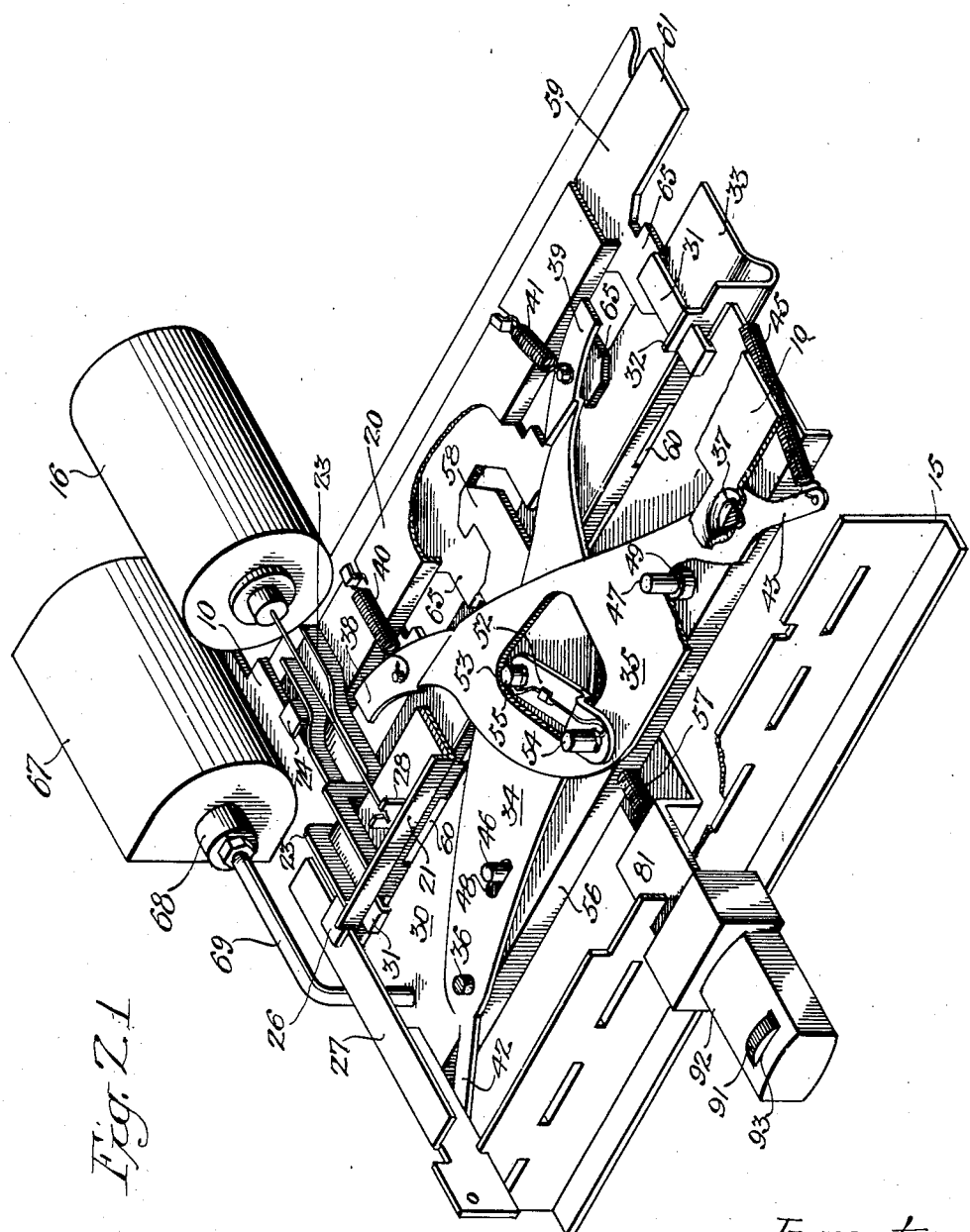

Patented Sept. 22, 1942

2,296,721

UNITED STATES PATENT OFFICE 2,296,721

TUNING MECHANISM

Harry J. Lyman, Royal Oak, and Dana C. Manning, Dearborn, Mich., assignors to Philco Radio and Television Corporation, Philadelphia, Pa., a corporation of Delaware Application September 6, 1940, Serial No. 355,678

15 Claims. (Cl. 250—40)

This invention relates to tuning devices for radio receivers and the like and more particularly to a novel tuning mechanism embodying manual and automatic tuning controls.

One object of the invention is to provide a compact and unitary device wherein said controls are embodied in a single unit and the device is capable of various adaptations or different modes of usage.

Another object of the invention is to provide a tuning device of this character which is relatively simple in construction and may be manufactured and assembled economically.

A further object of the invention is to provide an improved tuning device employing so-called "inductance tuning" and which overcomes difficulties inherent in prior devices of this general type.

Still another object of the invention is to provide a novel tuning mechanism wherein the automatic tuning controls are readily adjustable by the user and do not require adjustment by an expert serviceman or the use of aligning instruments.

A further object of the invention is to provide a novel tuning mechanism wherein straight line frequency tuning may be readily obtained and this result is accomplished at least in part by means of a novel pantograph operating mechanism forming a part of the device.

A further object of the invention is to provide a novel tuning device in which there is embodied novel electromagnetic means for facilitating operation of the device and for relieving the manual elements of strain incident to operation of the various parts.

Other objects and features of the invention will be apparent from the following detailed description.

In the accompanying drawings:

Fig. 4 is a plan view of the tuning mechanism showing the parts in a different position;

Fig. 5 is a horizontal sectional view of the tuning mechanism showing certain features thereof;

Fig. 6 is a similar view showing certain parts in operation;

Fig. 6A is a diagrammatic illustration of the electrical switch arrangement of the device;

Fig. 7 is a detail sectional view taken along line 7—7 of Fig. 5;

Fig. 8 is a fragmentary sectional view taken longitudinally of one of the control members;

Figs. 9 and 10 are longitudinal sectional views illustrating the operation of the manual tuning member;

Fig. 11 is an exploded view illustrating certain parts of a push-button assembly;

Fig. 12 is a detailed illustration of the pantograph mechanism employed in the tuning device;

Figs. 13 and 14 are fragmentary perspective views showing certain details of construction;

Figs. 15 to 19 are perspective views of various parts of the mechanism;

Fig. 21 is a perspective view of the entire mechanism with some parts omitted and others broken away for the sake of illustration.

Figure 1:
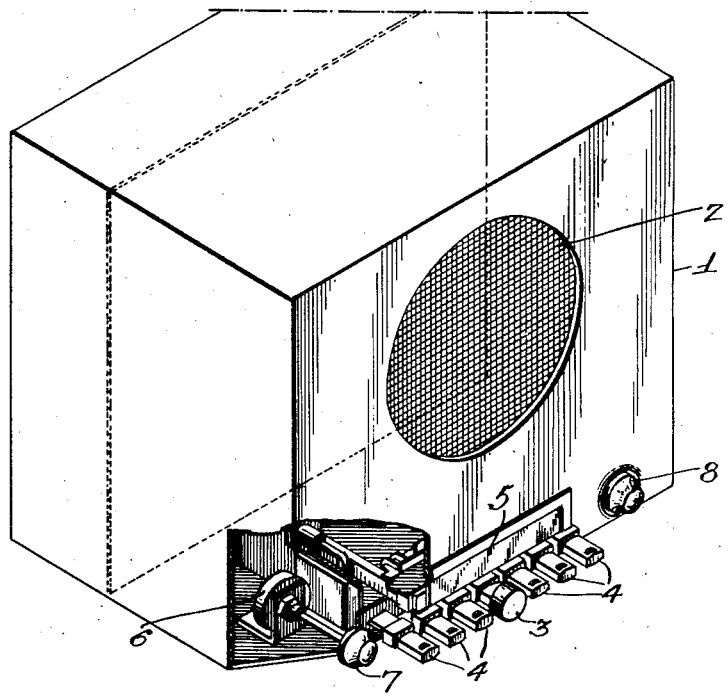
Fig. 1 is a perspective view of a radio receiver embodying one form of the invention.

In Fig. 1, there is illustrated one embodiment or arrangement of the tuning mechanism in a radio receiver. The receiver casing or housing is shown at 1 and has the usual loud-speaker grille 2 in the front face thereof. The tuning mechanism, presently to be described, is mounted as a unit in the lower central portion of the receiver casing with the push-button elements disposed as illustrated. In the specific embodiment shown, the tuning mechanism comprises a manual tuning element 3 and six automatic tuning elements designated generally by reference character 4, there being three such elements on each side of the manual tuning element. The tuning indicator dial is shown at 5 and is substantially coextensive with the push-button assembly. This dial may be provided with any suitable indicia, for example, it may have frequency designations thereon. A pointer (not visible in Fig. 1) is caused to move transversely across the dial in response to the tuning operations, as described more fully hereinafter.

On one side of the tuning mechanism, there is located the volume control device 6 operable by means of the rotatable knob 7, while on the other side of the tuning mechanism, there is disposed an off-on switch for the radio receiver controlled by the rotatable knob 8.

It will be understood that the arrangement of Fig. 1 is simply one possible embodiment of the tuning mechanism in a radio receiver and that other arrangements are possible, as mentioned hereinafter.

Referring now to the figures illustrating the tuning mechanism and particularly to Figs. 2 to 6, this mechanism is constructed as a unit with the parts thereof mounted on a supporting framework designated generally by reference character 9. By means of this unitary construction, it is possible to mount the mechanism as a unit within the radio receiver casing simply by providing suitable mounting brackets secured to the framework 9. The main element of the framework is the plate or frame member 10 shown in detail in Fig. 15. The particular structure of this member will be referred to in connection with the subsequent description. This member is provided with extending tongues 11 on its four edges by means of which the other elements 12 to 15 of the framework 9 are connected to it.

Figure 2:
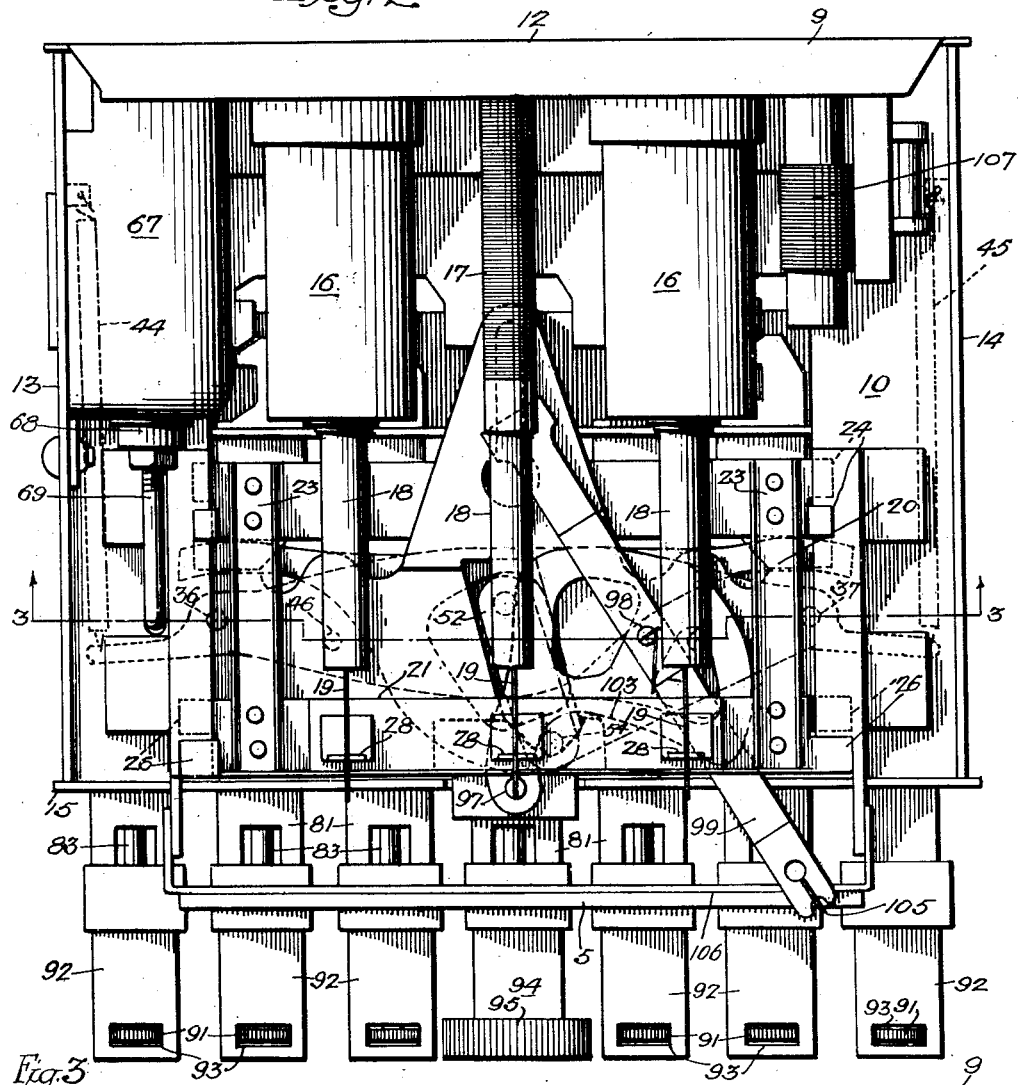
Fig. 2 is a plan view of the tuning mechanism showing the parts in one position.
Figure 3:
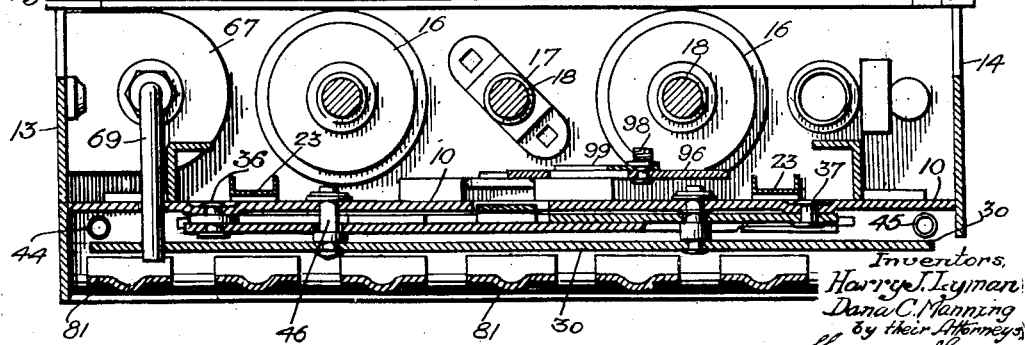
Fig. 3 is a sectional view taken along line 3—3 of Fig. 2.

As shown in Figs. 2 and 4, there are mounted within the framework 9 on the rear wall 12 thereof a plurality of tuning devices 16 whose purpose is to tune the radio receiver to different carrier frequencies. The devices 16 are variable inductance devices, each of which comprises a coil and a powered iron slug or core adapted to move into and out of the coil so as to vary its inductance. In the specific illustration, there are three such tuning devices and the central one is shown without a casing. The coil is shown at 17 while the movable core is shown at 18. The said tuning devices constitute components of the radio receiver circuit, and since this general method of tuning a radio receiver is well understood, it is unnecessary to illustrate the receiver circuit in detail. It will be understood, therefore, that the tuning devices are connected in the receiver circuit in conventional manner.

The iron cores 18 have attached to them wire connector elements 19, which in turn are connected to a movable carriage 20. This carriage is in the form of a rectangular frame comprising a front bar 21, a rear bar 22, and side elements 23. The rear bar 22 is substantially aligned with the main frame member 10 and carries guide elements 24 which slide along the edge portions 25 of member 10 (see Figs. 13 to 15). The front bar 21 is disposed above the main frame member 10 and carries side guide elements 26 which slide along guide rails 27 mounted on member 10 (see Fig. 21). Thus, the carriage 20 is movable from its forward position shown in Fig. 2 to its rearmost position shown in Fig. 4. The wire connectors 19 are attached to upwardly extending lugs 28 mounted on the front bar 21 of the carriage 20. This connection is effected in a simple manner by soldering the wires 19 in V-shaped recesses in the lugs. The lugs are insulated from the bar 21 by means of an insulating plate 29 thereon (see Fig. 4).

The movement of the carriage 20 is effected by means of the pantograph mechanism now to be described, which in turn is controlled by the manually-operable elements. A key bar 30 (see Figs. 3, 5 and 16) is slidably mounted within the framework below member 10 and carries projecting guide members 31 which slide within guide elements 32 (Fig. 17) on a transverse stationary bar 33. A pair of crossed lever members 34 and 35 (Figs. 12 and 21) are interposed between frame member 10 and key bar 30, and are pivotally attached to the stationary frame member 10 at pivots 36 and 37, respectively. The pivot openings in frame member 10 are shown in Fig. 15 at 36a and 37a, respectively. The rearward free ends 38 and 39 of the crossed pivotal levers engage the rear bar 22 of carriage 20 and are curved to act as cams, as will be further described later. The carriage is held in engagement with the curved ends 38 and 39 of the levers by means of coil springs 40 and 41. The opposite ends 42 and 43 of the pivoted levers are attached to coil springs 44 and 45 which are anchored to the stationary framework. These springs normally maintain the pivoted levers in the positions illustrated in solid lines in Fig. 12. However, when the key bar 30 is moved rearwardly, the pivoted levers are caused to move to an extended position, as illustrated in the dot-and-dash representation of Fig. 12, thereby moving the carriage 20, which in turn moves the adjustable elements of the tuning devices. Thus, the crossed levers and associated elements constitute a pantograph mechanism which is normally in collapsed condition but which may be extended to any desired position to adjust the tuning devices accordingly.

The operation of the pantograph mechanism by means of the key bar 30 is effected by pins 46 and 47 (see Figs. 3 and 16) carried by the key bar and extending through openings 48 and 49 in the levers 34 and 35. It will be seen that movement of the key bar 30 serves through pins 46 and 47 to operate the crossed levers 34 and 35 about their pivots against the restraining action of springs 44 and 45. The pins 46 and 47 also project through slots 50 and 51 in the frame member 10 and are suspended from the latter by cotter keys or the like. This pin and slot arrangement serves to support key bar 30 from frame member 10 and also serves to further support the levers 34 and 35. The crossed levers are also connected together by means of a link 52 (see Figs. 12 and 21) and associated pins 53 and 54 on the respective levers. To this end, the lever 35 is shaped as illustrated and has an opening 55 therein to permit the use of the connecting link. The pin 54 is extended and serves to actuate the pointer element of the tuning indicator, as will be described later.

The key bar 30 is coextensive with the manually-operable elements and is adapted to be actuated by any one of the said elements. To this end, the key bar has a turned flange 56 at its forward edge which is engageable by the free ends of the threaded shanks 57 on the respective control elements (see Figs. 9 and 10). Each of the control elements is constructed in a particular manner to provide for adjustment of the threaded shanks so that the free ends thereof may be adjusted to vary the position of the key bar 30. The specific construction of the control elements will be described later. At the rear end of each control element, there is provided a hook-like portion 58 (see Figs. 5 and 6) which is adapted to cooperate with a common latch bar 59 for the various control elements. The longitudinally-movable control elements are supported at their rear portions by means of the transverse bar 33 which has slots 60 therein (see Fig. 17) through which the control elements extend.

The latch bar 59 is arranged for transverse movement and to this end the end portions 61 and 62 of the latch bar are slidably disposed in support openings in the side walls 13 and 14 of the framework 9. The latch bar is normally held in a right hand position by means of spring 63 which is anchored to the fixed transverse bar 33 at 64. When any one of the control elements is depressed, the hook-like end 58 engages the associated portion 65 of the latch bar and cams the latch bar toward the left, permitting the portion 58 to interlock itself with the portion 65. The control element remains in this locked position until such time as a different element is depressed, whereupon the latch bar is caused to release the previously latched element, as will be clearly understood. It will be seen that the latch bar fixes the range of movement of each control element and, since all of the control elements have the same range of movement, the amount of movement of the key bar 30, effected by any particular control element, will depend upon the relation of the particular screw shank 57 to flange 56. By providing different relations between the ends of the screw shanks and flange 56, the key bar is caused to move different amounts in response to actuation of various control elements, and the key bar in turn actuates the tuning devices by corresponding amounts, through the action of the pantograph mechanism and carriage 20. Thus, the actuation of each control element is caused to tune the radio receiver to a particular frequency.

Each of the control elements has an associated spring 66 which is anchored to the front wall 15 of the framework 9. Consequently, the control elements return automatically to normal inoperative position whenever released.

In order to facilitate operation of the mechanism and to relieve the strain on the manual control elements, there is provided an electromagnet 67 (see Figs. 2 to 4) which is automatically energized in response to the actuation of the control elements. The armature 68 of the electromagnet has connected to it an L-shaped rod 69 which extends through a slot 70 in support member 10 and engages the key bar 30 at opening 71. Therefore, when the electromagnet is energized, the key bar 30 is moved by the armature. The energization of the electromagnet is effected by means of a switch 72 which is closed by the latch bar 59 whenever the latter is moved.

As shown in Figs. 5 to 7, the switch 72 comprises a stationary contact element 73 and a pivoted contact element 74 both mounted on an insulating block 75 carried on the lower face of the frame member 10. The pivoted contact element 74 carries a resilient contact arm 76 which is adapted to engage a second stationary contact 77 mounted on the insulating support. Thus there is provided a dual switch in which the movable contact cooperates with two stationary contacts. The contacts 73 and 74 serve to energize the electromagnet 67, while the contacts 76 and 77 may be utilized to mute the radio receiver during tuning. As shown in Fig. 6A, the contacts 76 and 77 may be arranged to close a short circuit across the receiver output or the input to the loud speaker. A coil spring 78 is connected between the pivoted contact element 74 and the switch support so as to urge the switch elements to closed position. The pivoted element 74 has formed thereon a projecting tongue 79 which extends into a slot 80 in the latch bar 59. The arrangement is such that the latch bar in its normal position holds the pivoted elements 74 in the switch-opening position, as shown in Fig. 5. But when the latch bar is actuated by the operation of one of the manual control elements, the tongue 79 is released, permitting the switch element 74 to move to the switch-closing position shown in Fig. 6.

Thus, when any one of the manual control elements is depressed, it immediately cams the latch bar toward the left and, as a result, the switch 72 is closed, thereby energizing the electromagnet 67 and muting the radio receiver. The electromagnet moves the key bar 30, thus assisting the manual operation. As soon as the manually-operated element has moved to its rearmost position, the latch bar 59 returns to its normal position to latch the actuated element. At the same time, the switch 72 is opened, thereby deenergizing the electromagnet and rendering the receiver operative. Thus, it will be seen that the electromagnet is energized only during the actuation of the mechanism and it serves to facilitate the manual operation and also to relieve the manually-operable elements of the strain incident to the operation of the various elements.

Referring now to the construction of the manually-operable elements and referring particularly to Figs. 8 to 11, each of the depressible elements comprises a supporting member 81 which is slidably carried by the front wall 15 of the main framework and by the stationary crossbar 33. As described above, the rear end of each of these members is hook-like formation for the above-described cooperation with the latch bar 59. As shown in Fig. 8, an apertured lug 82 is turned downward from the member 81 and serves as a bearing or support for the rod or shank 83. The threaded shank portion 57 above mentioned passes through a nut 84 which has an extension 85 disposed in an aperture 86 in the support member 81. A coil spring 87 (see Fig. 8) surrounds the threaded shank between the nut 84 and the shoulder 88 so as to take up the backlash between the associated elements. By this construction, it is assured that the adjustment of each manually-controllable element shall be very accurate.

The forward end of the shank 83 is flattened and has mounted thereon a metallic sleeve 89 having a knurled portion 90. The automatic tuning elements, of which there are six shown, each has a small knurled wheel 91 on the knurled end of sleeve 89. The wheel 91 may be formed of a molded plastic material and may be forced over the end of sleeve 89, causing the knurled end of the metallic sleeve to bite into the material of the wheel and thus locking the wheel on the sleeve. A knob 92 is fitted over the forward end of member 81 and has an axial opening to accommodate the shank 83 and sleeve 89 (see Fig. 4). The knob 92 also has an opening 93 in which the wheel 91 is disposed. Whenever it is desired to adjust one of the automatic tuning elements to correspond to a particular carrier frequency, that element is depressed as above described and the small wheel 91 is then rotated until the radio receiver is tuned to the desired frequency. This adjustment, of course, varies the position of the end of the threaded shank 57, thereby varying the position of the key bar 30 which determines the tuning effected by the particular manual element, as mentioned above. After adjustment has been made, the manual element is simply depressed whenever it is desired to tune the radio receiver to the particular frequency. Of course, the user may adjust any one of the automatic tuning elements at will to cause that element to correspond to any desired frequency in the operable range of the receiver. Thus, it is possible for the user to set up any desired stations to which he may wish to tune the receiver simply by depressing the automatic tuning elements. This eliminates the necessity of a servicing operation for this purpose.

The manual tuning element 3 (see Fig. 1), by which the user may manually tune the receiver to any desired station by rotating a knob, is of slightly different construction than the automatic tuning elements. As shown in Figs. 5 and 9 to 11, in this instance the knob comprises a stationary part 94 and a relatively large wheel 95. Part 94 is fitted over the end of member 81 while the wheel 95 is mounted on the knurled end of sleeve 89. This construction of the manual tuning element makes it possible for the user to adjust this element readily and quickly throughout the operating range of the receiver simply by turning the wheel 95, as illustrated in Figs. 9 and 10.

Thus there are provided a plurality of automatic tuning elements which may be adjusted at will by the user to set up desired stations and which are normally simply depressed to effect tuning, and there is also provided a manual tuning element by which the user may readily tune the receiver to any desired station. Moreover, it will be noted that the construction is such that any one of the tuning elements may be used as the manual element simply by changing the knob thereof.

Referring now to the indicating mechanism embodied in the device, as shown in Figs. 2 and 4, a rocker member 96 is pivotally mounted on a pin 97 projecting from the frame member 10. This rocker member in turn carries a pin 98 which serves as a pivot for the pointer arm 99. The rear end of the pointer arm has a guide portion 100 (see Fig. 19) which rides within the slot 101 of frame member 10. A small coil spring 102 is disposed on pin 98 and is arranged to urge the pointer arm toward the right hand position shown in Fig. 2. It has been previously mentioned that the pin 54 (see Fig. 12) is extended and it may new be noted that this pin engages the cam edge 103 of the rocker member 96 (see Fig. 4). The pin 54 moves within the slot 104 in member 10 (see Fig. 15) during the movement of the pantograph mechanism above described, and as the pin moves from its normal position of Fig. 2 toward its rearmost position shown in Fig. 4, it rotates the rocker member 96 counterclockwise which in turn moves the pointer arm 99 from the position of Fig. 2 toward the position of Fig. 4. It will be noted that the rear end portion of the pointer arm acts as a movable pivot during the movement of the said arm. At its forward end, the pointer arm carries a pointer element 105 which cooperates with the indicator dial as previously mentioned. As illustrated, the brackets 27 may support a transverse member 106 which may serve as a support for the dial.

An important feature of the structure provided by this invention resides in the fact that it lends itself to straight line frequency tuning. It is characteristic of inductance tuning devices that the rate of change of frequency is not uniform with uniform core motion. The pantograph mechanism employed according to the present invention lends itself to compensation for the non-uniform change of frequency of the tuning devices. To some extent at least this compensation may be effected by design of the curved ends 38 and 39 of the pantograph arms, although the curvature of the arms is also governed by the accuracy and range of operation of the device. However, any deficiency in the desired compensation may be supplied by non-uniform winding of the coils of the tuning device. This is illustrated in Fig. 4 wherein the coil of the right hand tuning device is shown wound unevenly to assist in the above-mentioned compensation. It will be understood, of course, that all three of the tuning devices illustrated may be thus constructed for the stated purpose.

The structure provided by the invention also makes it possible to have the indicia on the indicator dial arranged uniformly irrespective of whether or not straight line frequency tuning is effected. This is made possible by the particular mechanism for operating the pointer arm 99. By proper design of the cam edge 103 of the rocker member 96, it is possible to effect the necessary compensation so that the pointer may be caused to move uniformly in correspondence to the frequency change which is effected by the tuning mechanism.

A further feature of the device is that it provides the high degree of precision and complete freedom of backlash which are necessary in an inductance tuner. These exacting requirements of this type of tuner have presented a serious problem in the past. In the present device, however, these requirements are met by means of adjustable elements in which the backlash is completely removed by the construction hereinbefore described.

It is also worthy of note that in the use of this device, the wire connectors 19 extending from the adjustable cores may be soldered to the lugs 28 on the carriage 20 with sufficient accuracy such that true tracking of the coils may be effected by means of a small trimming coil 107 (see Figs. 2 and 4).

Figure 20:
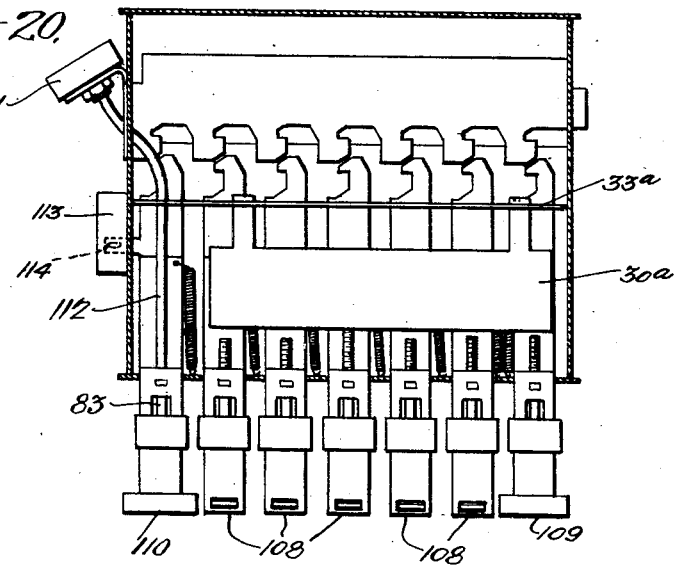
Fig. 20 is an illustration of a different embodiment of the invention.

Referring now to Fig. 20, there is illustrated an alternative embodiment of the invention in a radio receiver, showing the flexibility of adaptation of the device. In this instance, the manually-controllable elements 108 are used for automatic tuning while the extreme right hand element 109 is used for manual tuning. The extreme left hand element 110 is in this instance employed to operate a rotatable volume control 111. To this end, a flexible shaft 112 is connected between the unit 111 and the rotatable shank 83 of the particular manual control member. Since the device 111 is operated solely by rotation, the control member 110 is provided with a relatively large rotatable wheel or knob similar to that of the manual control member 109.

In addition there is provided an on-off switch 113 mounted on the side of the frame and operable by a projection 114 on the element 110. Thus when element 110 is depressed the switch 113 will be opened to deenergize the receiver, and whenever any one of the elements 108 is depressed, element 110 will move to the position shown to close the switch 113 and energize the receiver.

It will be noted that in the device of Fig. 20, the transverse bar 33a corresponding to the similarly numbered element of the above-described structure is slightly modified as is also the key bar 30a. By providing an aperture in the fixed bar 33a, this element may be caused to serve as a bearing or support for the shaft 112. By employing the slightly modified elements 30a and 33a, it is a simple matter to connect the flexible shaft 112 to the rotatable shaft of one of the manually-operable elements for the purpose above mentioned.

Thus, it will be seen that the structure provided by this invention is capable of various arrangements and adaptations and this greatly increases the usefulness of the device. It will be understood, of course, that the invention is capable of further modifications and adaptations within the scope of the invention.

We claim:

1. A tuning mechanism for a radio receiver, comprising a longitudinally movable tuning element, a slidable control member therefor, a plurality of manually operable push-buttons, a key bar movable by said push-buttons to various positions of adjustment, and a pair of oppositely movable pivoted levers adjustable by said key bar upon movement thereof and adapted to position said member and said tuning element in accordance with the position of said key bar.

2. A tuning mechanism for a radio receiver comprising a plurality of longitudinally movable tuning elements, a movable carriage therefor, a plurality of manually operable push buttons, a key bar adjustable laterally by said push buttons, and pivoted levers actuable by said key bar, said levers each having a cam face on one portion thereof, said cam faces bearing on said carriage, whereby said carriage is positioned in accordance with the actuation of said push buttons.

3. The combination with an adjustable radio tuning device having inherently a non-linear displacement versus frequency characteristic, of a plurality of selective manually-operable elements, a member common to said elements and engageable thereby for movement to various positions under control of said elements, a driving mechanism including a pair of crossed pivoted arms operable by said member to actuate said tuning device, and means comprising cam portions on said arms for effecting compensation of the non-linear characteristic of said tuning device.

4. The combination with an adjustable tuning device for a radio receiver or the like, of a plurality of manually-operable elements selectively movable from a non-operative position to an operative position, latching means for latching an actuated element in operative position, a member common to said manual elements and engageable thereby for movement to various positions under control of said elements, an electromagnet arranged to actuate said member, means operable by said latching means for energizing said electromagnet in response to actuation of any one of said elements, and means operable by said member for variously actuating said tuning device according to the movement of said member.

5. A tuning mechanism for a radio receiver, comprising a plurality of longitudinally movable tuning elements, a movable carriage therefor, a pair of pivoted levers for actuating said carriage, said levers each having a cam face on a portion thereof, said cam faces engaging said carriage, a key bar attached to said levers to actuate the same, a plurality of selectable manually operable push buttons, a slidable latch bar having a normal rest position and arranged to latch any of said buttons in a depressed position and to free any previously depressed button, a switch actuated by said latch bar when the same is moved from normal position, an electromagnet energizable by said switch, and an armature actable by said magnet and adapted to move said key bar, whereby said magnet is energized to operate the tuning mechanism upon the depression of one of said push buttons.

6. A tuning mechanism for a radio receiver comprising a plurality of longitudinally movable tuning elements, a movable carriage therefor, a plurality of manually operable push buttons, means for selectively positioning said carriage in accordance with the operation of said push buttons, slidable latch means operable by said buttons for selectively latching said buttons in a depressed position, a switch operable by said latch means, an electromagnet controlled by said switch, and an armature for said magnet operatively connected to said carriage, whereby said magnet relieves the load on said push buttons during the actuation thereof.

7. A tuning mechanism for a radio receiver comprising a plurality of longitudinally movable tuning elements, a movable carriage therefor, a plurality of manually operable push buttons, means for selectively positioning said carriage in accordance with the operation of said push buttons, biasing means for maintaining said carriage in cooperative relation with said positioning means, slidable latch means operable by said buttons for selectively latching said buttons in a depressed position, a switch operable by said latch means, an electromagnet controlled by said switch, and an armature for said magnet operatively connected to said carriage to move said carriage until the actuated push button is latched.

8. A tuning mechanism for a radio receiver, comprising a mechanically adjustable tuning means, a member for actuating said tuning means, a plurality of manually operable push-buttons, a key bar adjustable by said buttons to a plurality of selectable positions, and a pair of pivoted levers constrained for equal movement in opposite sense and operable by said key bar upon movement thereof by a push-button, each of said levers having an end engaging said member to selectively position the same.

9. A tuning mechanism for a radio receiver, including a plurality of selectable, manually operable push-buttons, a slidable carriage, tuning means operable by said carriage, said carriage comprising a rigid frame having at least two bar members in different planes, said tuning means being actuated by one of said bar members, each of said bar members being slidably supported by a pair of guides and being constrained thereby to move in a direction parallel to said guides, a pair of pivoted levers engaging the second of said bar members, a key bar engageable by said push-buttons and operatively connected to said levers to actuate the same, and means tending to maintain said levers in engagement with said second bar member.

10. A tuning mechanism for a radio receiver, comprising a supporting framework, a plurality of longitudinally adjustable tuning devices mounted on said framework, a common actuator for said devices slidably mounted on said framework, a plurality of selectable push-button members slidably carried by said framework and movable from a non-operative position to an operative position, a key bar common to said members and slidably mounted on said framework for actuation by said members, and means comprising a pair of oppositely movable levers pivoted on said framework and operable by said key bar for moving said actuator in accordance with actuation of said push buttons.

11. A tuning mechanism for a radio receiver, comprising a supporting frame work, a plurality of tuning devices mounted on said framework, a common actuator for said devices slidably mounted on said framework, a plurality of push-button members slidably carried by said framework, a key bar common to said members and slidably mounted on said framework for actuation by said members, all of the aforesaid slidable elements being movable in the same direction, and a leverage system comprising a pair of oppositely movable levers pivoted on said framework and operable by said key bar for moving said actuator.

12. A tuning and indicating mechanism for a radio receiver, comprising a tuning device, a plurality of selective manually operable elements, means including a pair of crossed levers for actuating said device in response to operation of one of said elements, a link connected between pivots on the respective levers, one of said pivots being extended, an indicating device, and means operable by said extended pivot for actuating said indicating device.

13. A tuning and indicating mechanism for a radio receiver, comprising a tuning device, a plurality of selective manually operable elements, means including a pair of crossed levers for actuating said device in response to operation of one of said elements, an indicator arm, a movable pivot at one end of said arm, an indicator element carried by the other end of said arm, and cam means carrying said arm and operable by said crossed levers for effecting translatory movement of said arm such that said indicator element is moved substantially in a single plane.

14. A tuning mechanism for a radio receiver, comprising a stationary support, a pair of oppositely movable crossed levers having separate pivots affixing them to said support, a key bar cooperatively associated with said levers and arranged for translational movement, connections between said key bar and said levers for effecting pivotal movement of said levers in response to translational movement of said key bar, a tuning device operable by said levers, and a plurality of push-button elements arranged cooperatively with said key bar and adapted to variously position the same, thereby to adjust said tuning device through the action of said levers.

15. A tuning mechanism for a radio receiver including a framework, a plurality of selectable, manually operable, slidable push-bottons, a slidable carriage, said carriage comprising at least two members in different planes, a tuning element, said tuning element being actuated by one of said members, a pair of oppositely movable levers pivoted on said framework, a key bar engageable by said push-buttons and operatively connected to said levers to actuate the same, said levers engaging the other of said members to position said carriage and said tuning element, said framework including guide members slidably supporting said carriage, such that said first-mentioned member and said tuning element may overlie said pivoted levers.

HARRY J. LYMAN.
DANA C. MANNING.